(12) United States Patent
Fujii

(10) Patent No.: US 9,140,888 B2
(45) Date of Patent: Sep. 22, 2015

(54) OBJECTIVE LENS FOR ENDOSCOPE, AND ENDOSCOPE

(75) Inventor: Sachiko Fujii, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 284 days.

(21) Appl. No.: 13/696,645

(22) PCT Filed: Mar. 10, 2011

(86) PCT No.: PCT/JP2011/055597
§ 371 (c)(1),
(2), (4) Date: Nov. 7, 2012

(87) PCT Pub. No.: WO2011/152099
PCT Pub. Date: Dec. 8, 2011

(65) Prior Publication Data
US 2013/0057666 A1 Mar. 7, 2013

(30) Foreign Application Priority Data

Jun. 1, 2010 (JP) .................................. 2010-125837

(51) Int. Cl.
*H04N 5/232* (2006.01)
*G02B 23/24* (2006.01)
*G02B 13/16* (2006.01)

(52) U.S. Cl.
CPC .............. *G02B 23/243* (2013.01); *G02B 13/16* (2013.01)

(58) Field of Classification Search
None
See application file for complete search history.

(56) References Cited

U.S. PATENT DOCUMENTS

| 5,162,947 | A  | * | 11/1992 | Ito ................................. | 359/692 |
| 6,433,937 | B1 |   | 8/2002  | Konno |  |
| 6,577,452 | B2 | * | 6/2003  | Ohtake et al. ................. | 359/693 |
| 2008/0180809 | A1 |   | 7/2008 | Igarashi |  |
| 2008/0252997 | A1 | * | 10/2008 | Duckett ....................... | 359/753 |

FOREIGN PATENT DOCUMENTS

| CN | 101067677 | 11/2007 |
| CN | 101630058 | 1/2010 |
| JP | 3-100511 | 4/1991 |

(Continued)

OTHER PUBLICATIONS

International Search Report dated May 31, 2011 with English language translation.

(Continued)

*Primary Examiner* — Sath V Perungavoor
*Assistant Examiner* — Kate Luo
(74) *Attorney, Agent, or Firm* — Greenblum & Bernstein, P.L.C.

(57) ABSTRACT

An objective lens for an endoscope, comprising a first lens group having a negative power, an aperture stop, and a second lens group having a positive power arranged in this order from an object side, wherein the first lens group comprises at least a negative front group lens having a concave surface facing an image side, and a positive front group lens having a convex surface facing the image side arranged in this order from the object side, and the second lens group comprises at least a positive rear group lens having a convex surface facing the image side and a cemented lens formed by cementing together a negative lens and a positive lens being arranged in this order from the object side, and wherein the objective lens for an endoscope is configured to satisfy a predetermined condition.

10 Claims, 9 Drawing Sheets

(56) References Cited

FOREIGN PATENT DOCUMENTS

| | | |
|---|---|---|
| JP | 6-308381 | 11/1994 |
| JP | 11-14902 | 1/1999 |
| JP | 3359092 | 10/2002 |
| JP | 3359092 | 12/2002 |
| JP | 2004-117607 | 4/2004 |
| JP | 2008-107391 | 5/2008 |
| JP | 2009-109576 | 5/2009 |
| JP | 2009-163256 | 7/2009 |

OTHER PUBLICATIONS

International Preliminary Report on Patentability dated Dec. 13, 2012 with English language translation.

China Office action, dated May 29, 2014 along with an English translation thereof.

Japan Office action, dated Sep. 19, 2014 along with an English translation thereof.

China Office action, dated Feb. 6, 2015 along with an English translation thereof.

* cited by examiner

OBJECTIVE LENS FOR ENDOSCOPE, AND ENDOSCOPE

TECHNICAL FIELD

The present invention relates to an endoscope for observing an inside of a living body, and an objective lens for an endoscope installed in a tip portion of the endoscope. Specifically, the present invention relates to an endoscope and an objective lens for an endoscope designed to have a wide angle of view and to be compact in size while maintaining suitable optical performance.

BACKGROUND OF THE INVENTION

As an apparatus for examining a body cavity of a patient, an endoscope is generally known and has been put into practical use. The endoscope of this type is required to be compact in size so that a tip portion thereof can be smoothly inserted into a minute gap. The design minimum outer diameter of the tip portion is substantially defined by a large size component installed therein. One of such large size components is an objective lens for endoscope. To select a small objective lens for an endoscope as a component to be installed is an effective measure for downsizing the tip portion.

In order to reduce overlooking of a diseased tissue by an operator, a designer of the objective lens for an endoscope is also required to widen an observation filed, i.e., to design the objective lens to have a wide angle of view. However, regarding an optical lens, there is a problem that, in general, the curvature of field increases in proportion to the square of the angle of view, and thereby the image quality deteriorates. In order to obtain an image to be presented for a precise diagnosis, the objective lens for an endoscope is required to be compact in size and have a wide angle of view while suppressing deterioration of the optical performance. Japanese Patent Publication No. 3359092 (hereafter, referred to as a "patent document 1") describes an example of a concrete configuration of an objective lens for an endoscope of this type. The objective lens for an endoscope described in patent document 1 achieves both downsizing and widening of the angle of view while suppressing deterioration of the optical performance, by using a high refractive index lens.

SUMMARY OF THE INVENTION

In general, the conventional objective lens for an endoscope such as an objective lens described in patent document 1 is configured to have an angle of view of approximately 140° in view of maintaining of the optical performance and the size restriction. Such level of angle of view requires the tip portion of the endoscope to be bent and turned, for example, when a tube wall or a back side of a crimple of a large intestine is observed. However, if the diameter of a tube cavity is small, the motion of the tip portion is restricted, and thereby it might become impossible to turn the tip portion to a desired direction. Furthermore, in the case where the diagnosis is performed while various changing the direction of the tip portion, if the operation is complicated, the time for diagnosis increased. This is a burden for both of an operator and a patient and is not desirable.

For this reason, the objective lens for an endoscope is required to further widen the angle of view so that the observation field is further increased. In order to further increase the angle of view in patent document 1, it is necessary to design the objective lens for an endoscope using a high refractive index lens. However, if a designer tries to widen the angle of view by employing a high refractive index lens, the chromatic aberration of magnification might occur largely and the image quality might be deteriorated. In particular, there is a problem that the color shift occurs significantly at a part closer to the periphery of the observation field, and the optical performance suitable for observation for a tube cavity cannot be achieved.

The present invention is made in view of the above described circumstances. The object of the invention is to provide an objective lens for an endoscope, and an endoscope designed to be compact in size and to have a wide angle of view while maintaining suitable optical performance.

To solve the above described problem, according to an embodiment of the invention, there is provided an objective lens for an endoscope, comprising: a first lens group having a negative power; an aperture stop; and a second lens group having a positive power. The first lens group, the aperture stop and the second lens group are arranged in this order from an object side. The first lens group comprises at least a negative front group lens having a concave surface facing an image side, and a positive front group lens having a convex surface facing the image side, the negative front group lens and the positive front group lens being arranged in this order from the object side. The second lens group comprises at least a positive rear group lens having a convex surface facing the image side and a cemented lens formed by cementing together a negative lens and a positive lens, the positive rear group lens and the cemented lens being arranged in this order from the object side. When a focal length of the first lens group is defined as $f_F$ (unit: mm), a total focal length of the first lens group and the second lens group is defined as f (unit: mm), a radius of curvature of an object side surface of the negative front group lens is defined as $R_1$ (unit: mm), and a radius of curvature of an image side surface of the negative front group lens is defined as $R_2$ (unit: mm), the objective lens for an endoscope satisfies following conditions (1) and (2):

$$-3.5 \leq f_F/f \leq -1.5 \tag{1}$$

$$1.3 \leq SF \leq 1.6 \tag{2}$$

where $SF=(R_1+R_2)/(R_1-R_2)$.

When $f_F/f$ gets larger than the upper limit of the condition (1), the negative power in the first lens group is excessive. Therefore, in this case, it is difficult to suitably correct the aberrations including the coma and the chromatic aberration when the designer tries to widen the angle of view. Furthermore, since, in this case, it becomes necessary to set the magnification of the second lens group to be high, it becomes difficult to suppress the change of magnification of the second lens group due to an error between the first lens group and the second lens group during assembling. Since the change of the angle of view due to change of the magnification is large, it becomes difficult to ensure the angle of view satisfying requirements. When $f_F/f$ gets smaller than the lower limit of the condition (1), it becomes difficult to design the objective lens for an endoscope to decrease the outer lens diameter, which is not suitable for downsizing. Furthermore, since, in this case, it is necessary to set the magnification of the first lens group to be high, tilting of an image plane caused when the objective lens is assembled in a state where the first lens group is decentered from the optical axis AX becomes large, and thereby deterioration of the image quality becomes easy to occur in the peripheral portion of the observation field. The tilting of the image plane means a phenomenon that the curvature of field which would ideally remain symmetrically with respect to the optical axis remains asymmetrically with respect to the optical axis depending on the decentering amount and the decentering direction during assembling of imaging lenses.

When SF gets larger than the upper limit of the condition (2), feeling of insertion which can be provided when the electronic scope is inserted into a tube cavity is lost. Furthermore, regarding the negative front group lens, the radius of curvature of the object side surface becomes small and thereby the projecting amount of the object side surface increases. Therefore, the detergent property decreases and the object side surface becomes easy to be damaged. When SF gets smaller than the lower limit of the condition (2), the resolution in the peripheral apportion of the observation field in which a subject such as a tube wall is displayed decreases, which is not suitable for observation of a tube cavity. Furthermore, regarding the negative front group lens, the radius of curvature of the object side surface is large, and therefore the incident angle to the object side surface becomes larger and the loss of light amount becomes easy to occur.

In order to further suppress deterioration of the optical performance which might occur in the peripheral portion in the observation field when the angle of view is widened, when a focal length of the negative front group lens is defined as $f_1$, the objective lens for an endoscope may be configured to satisfy a following condition (3):

$$-1.8 \leq f_1/f \leq -1.1 \tag{3}$$

When $f_1/f$ gets larger than the upper limit of the condition (3), it becomes difficult to suitably correct the astigmatism and the chromatic aberration and the peripheral resolution decreases because power of the negative front group lens is strong. When $f_1/f$ gets smaller than the lower limit of the condition (3), power of the negative lens L1 becomes too weak, and such a state is not suitable for design for widening the angle of view while suppressing the effective beam radius.

In order to widen the angle of view while maintaining the curvature of field in a suitable condition for observation of a tube cavity, when a focal length of the positive rear group lens is defined as $f_3$, the objective lens for an endoscope may be configured to satisfy a following condition (4):

$$2.0 \leq f_3/f \leq 4.0 \tag{4}$$

When f3/f gets larger than the upper limit of the condition (4), Petzval sum becomes large due to the strong positive power of the entire objective lens for an endoscope, and the image plane tends to tilt to an under condition when the diameter of a tube cavity of an observation target is thin. When f3/f gets smaller than the lower limit of the condition (4), Petzval sum becomes small and the image plane tends to tilt to an over condition when the diameter of the tube cavity for an observation target is thick, because the total positive power of the objective lens 100 for an endoscope is weak. Therefore, for either case, the resolution in a peripheral portion of the observation field in which a subject such as a tube wall is displayed decreases, and it becomes difficult to observe a subject such as a tube wall in a fine video.

In order to effectively avoid decrease of the resolution in the vicinity of the center of the observation field while enhancing the resolution in a peripheral portion of the observation field, when a maximum image height in an imaging plane is defined as y, an intermediate image height lower than the maximum image height y is defined as $y_i$, a half view angle corresponding to the maximum image height y is defined as $\omega_m$, and a half view angle corresponding to the intermediate image height $y_i$ is defined as $\omega_i$, the objective lens for an endoscope may be configured to satisfy a following condition (5):

$$1.3 \times \sin(\omega_i/1.3) \leq y_i/f \leq 3.0 \times \sin(\omega_i/3.0) \tag{5}$$

where $60° \leq \omega_i \leq \omega_m$.

When $y_i/f$ gets larger than the upper limit of the condition (5), it is impossible to avoid decrease of the resolution in the vicinity of the center of the observation field. When $y_i/f$ gets lower than the lower limit of the condition (5), it is impossible to avoid decrease of the resolution in a peripheral portion of the observation field.

In order to effectively suppress decrease of the resolution in a peripheral portion of the observation field by tilting of an image plane, an object side surface of the positive front group lens may be a planar surface.

In order to effectively suppress loss of light amount by surface reflection, when an incident angle of a light ray entering at a point at the maximum image height y with respect to the object side surface of the negative front group lens is defined as $\theta$, the objective lens for an endoscope may be configured to satisfy a following condition (6):

$$\theta \leq 75 \tag{6}$$

When $\theta$ stays away from the condition (6), the loss of light amount by the surface reflection becomes large if a high refractive index glass material is used for the negative front group lens.

For example, in order to ensure the insulating property of the electronic scope, when a maximum image height in an imaging plane is defined as y, the objective lens for an endoscope may be configured to satisfy a following condition (7):

$$2.0 \leq R_1/y \leq 5.5 \tag{7}$$

When $R_1/y$ gets larger than the upper limit of the condition (7), it becomes difficult to secure an adequate peripheral thickness adequate of the negative front group lens, and therefore it becomes difficult to secure a peripheral thickness adequate for ensuring the insulating property. Furthermore, since in this case the incident angle to the object side surface of the negative front group lens is large, the loss of light amount by the surface reflection increases. When $R_1/y$ gets smaller than the lower limit of the condition (7), the projecting amount of the object side surface of the negative group lens increases, and thereby the detergent property decreases and the objective lens becomes easy to be damaged.

In order to suppress loss of light amount by surface reflection while also suppressing the projecting amount of the object side surface of the negative front group lens, when a maximum image height in an imaging plane is defined as y, and an effective beam radius of the negative front group lens at the maximum image height y is defined as D, the objective lens for an endoscope may be configured to satisfy a following condition (8):

$$2.0 \leq D/y \leq 3.0 \tag{8}$$

When D/y gets larger than the upper limit of the condition (8), the projecting amount of the object side surface of the negative front group lens can be suppressed, but the loss of light amount by the surface reflection increases because the incident angle to the object side surface of the negative front group lens is large. Furthermore, it is difficult to suppress the entire length (the length in the optical axis direction) of the objective lens 100 for an endoscope. When D/y gets smaller than the lower limit of the condition (8), the loss of light amount by the surface refection on the object side surface of the negative front group lens can be suppressed, but the projecting amount of the object side surface of the negative front group lens becomes large. Therefore, the detergent property deteriorates and the objective lens becomes easy to be damaged.

In order to more suitably suppress correct the curvature of field which increases depending on widening of the angle of view, the second lens group may further include a positive lens between the positive rear group lens and the cemented lens.

In order to solve the above described problem, an endoscope according to an embodiment of the invention is configured such that the above described objective lens for an endoscope is installed in a tip portion thereof.

According to the invention, an objective lens for an endoscope and an endoscope designed to be compact in size and to have a wide angle of view while maintaining suitable optical performance are provided.

EMBODIMENTS FOR CARRYING OUT THE INVENTION

In the following, an electronic scope and an objective lens for an endoscope installed in the electronic scope according to an embodiment of the present invention are described with reference to the accompanying drawings.

Figure 1:
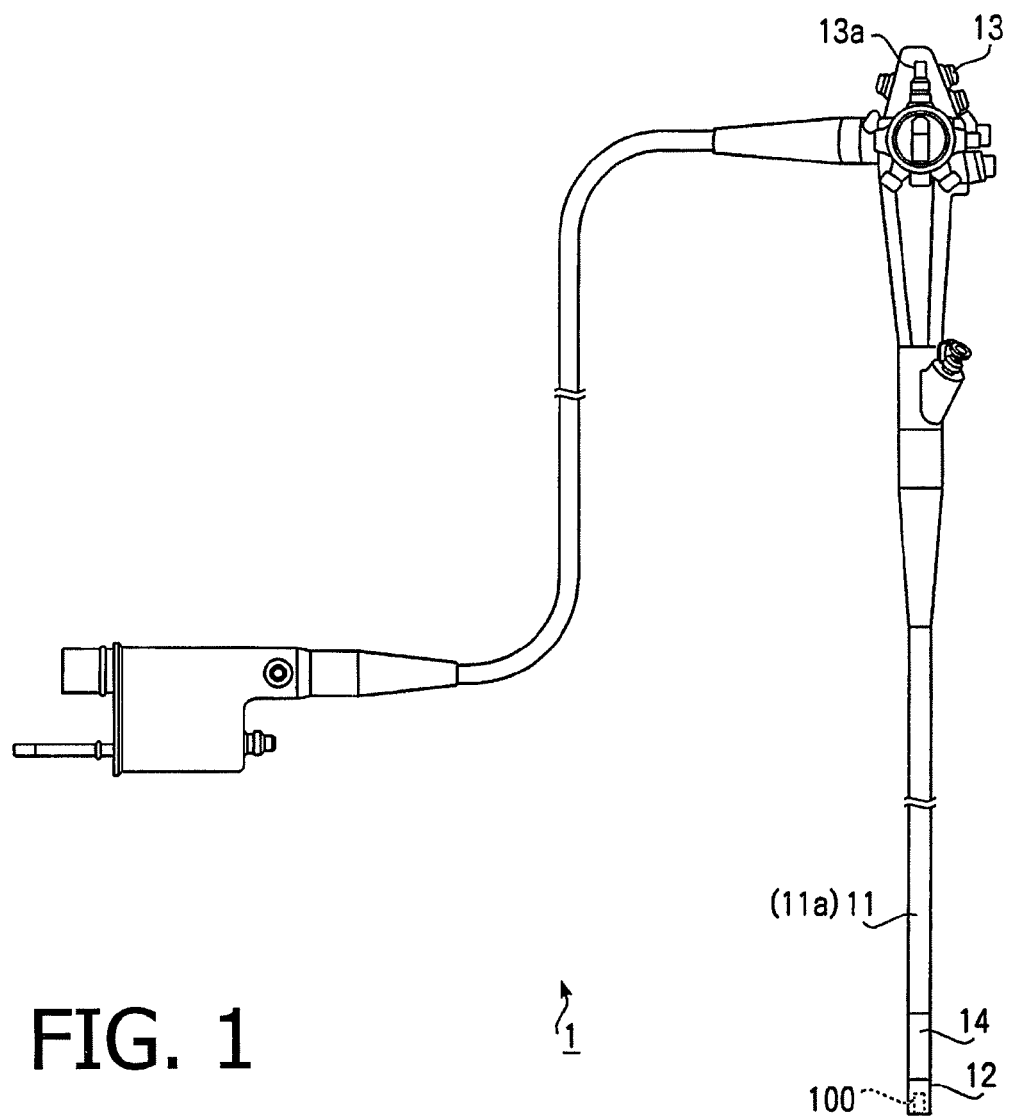
FIG. 1 illustrates an outer appearance of an electronic scope according to an embodiment of the invention.

FIG. 1 illustrates an outer appearance of an electronic scope 1 according to the embodiment. As shown in FIG. 1, the electronic scope 1 includes a flexible tube 11 covered with a flexible sheath 11a. To a tip of the flexible tube 11, a tip portion 12 covered with a resin casing having rigidity is connected. A bending portion 14 provided at a joint part of the flexible tube 11 and the tip portion 12 is configured to be able to freely bend by a remote operation (specifically, a rotating operation for a bending operation knob 13a) from a manual operation unit 13 connected to the proximal end of the flexible tube 11. This bending mechanism has a known structure installed in a general electronic scope, and is configured to be bent by drawing an operation wire in conjunction with the rotating operation for the bending operation knob 13a. In accordance with changing of the direction of the tip portion 12 by the above described operation for the bending motion, an imaging area of the electronic scope 1 moves.

In the inside of the resin casing of the tip portion 12, an objective lens 100 for an endoscope is installed (see a block surrounded by a dashed line in FIG. 1). The objective lens 100 for an endoscope converges light from a subject onto a light-reception surface of a solid state image pick-up device (not shown) in order to obtain image data of the subject in the imaging area.

We consider an endoscope for observing, for example, a digestive system, as the electronic scope 1 according to the embodiment. The electronic scope 1 is required to be compact in size and to have a wide angle of view for imaging a thin tube cavity, such as a large intestine, in a wide filed. For this reason, the electronic scope 1 is configured to suppress the outer size of the tip portion 12 by designing the objective lens 100 for an endoscope, which is a large component to be installed, to be compact in size. In order to reduce overlooking of a diseased tissue by an operator by widening the observation field, the objective lens 100 for an endoscope is also designed to have a wide angle of view while maintaining the compact size. It is desirable that the objective lens 100 for an endoscope has an angle of view larger than or equal to 170°.

Figure 2:
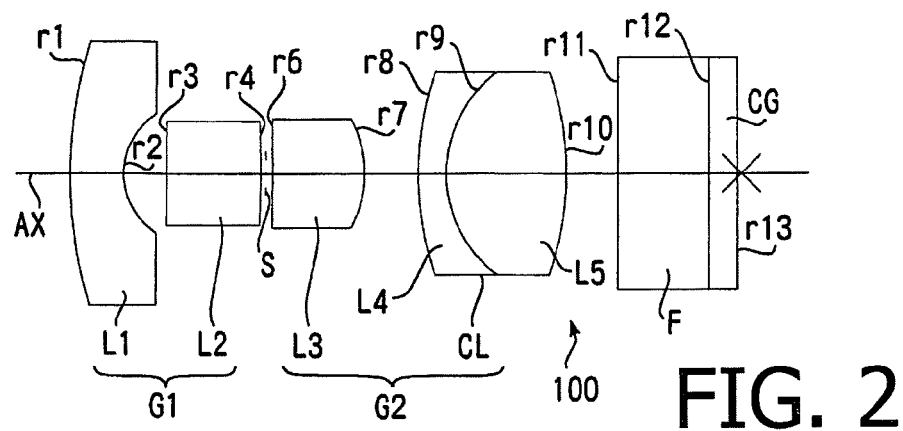
FIG. 2 is a cross sectional view illustrating an arrangement of an objective lens for an endoscope and optical components provided on the rear side of the objective lens according to the embodiment (example 1) of the invention.

FIG. 2 is a cross sectional view illustrating an arrangement of the objective lens 100 for an endoscope and optical components provided on the rear side of the objective lens 100 according to an example 1 of the invention (which is described in detail later). In the following, the objective lens 100 for an endoscope according to the embodiment of the invention is described in detail with reference to FIG. 2.

As shown in FIG. 2, the objective lens 100 for an endoscope includes at least a first lens group G1, an apertures stop S and a second lens group G2. Each optical lens constituting the first lens group G1 and the second lens group G2 has a rotationally-symmetrical shape with respect an optical axis AX of the objective lens 100 for an endoscope. On the rear side of the second lens group G2, a color correction filer F for a solid state image pick-up device is arranged.

The expression "includes at least" used above means that the objective lens may include an another optical component within the scope of the present invention. For example, a configuration where a parallel plate not substantially contributing to the optical performance with respect to the objective lens for an endoscope according to the invention is added, or a configuration where another optical component is added while maintain the configuration and advantages of the objective lens of an endoscope can be considered. For the same reason, the expression "includes at least" is used for explanations for the first lens group G1 and the second lens group G2.

The first lens group G1 is a lens group arranged on the object side with respect to the aperture stop S. The first lens group G1 includes at least a negative lens L1 having a concave surface facing the image side, and a positive lens L2 having a convex surface facing the image side, which are arranged in this order from the object side. The first lens group G1 has a negative total power for widening the angle of view, i.e., for taking a subject over a wide filed. When power of the negative lens L1 is increased for widening of the angle of view, asymmetricity between the first lens group G1 and the second lens group G2 increases, and thereby it becomes difficult to correct the distortion, and the aberrations including a coma and the chromatic aberration increase because curvature of the negative refractive surface increases. For this reason, in this embodiment, the positive lens L2 is arranged on the front side of the aperture stop S so that the strong negative power of the negative lens L1 can be cancelled in the first lens group G1.

It is desirable that the positive lens L2 is configured to have a flat surface on the object side so as to effectively suppress decrease of resolution in a peripheral portion of the observation field by tilting of the image plate which might become easy to occur due to widening of the angle of view of the negative lens L1.

The second lens group G2 is a lens group arranged on the image side with respect to the aperture stop S. The second lens group G2 includes at least a positive lens L3 and a cemented lens CL in which a negative lens L2 is adhered to a positive lens L5, which are arranged in this order from the object side. In order to cause the subject to be converged on the light reception surface of the solid state image pick-up device over a wide area, the second lens group G2 has a positive total power. When a lens having a concave surface facing the image side is employed, as the positive lens L3, in the second lens group G2 having a positive total power, the angle of emergence becomes large. Therefore, it is difficult to secure an adequate exit pupil distance. To avoid occurrence of such a problem, in this embodiment, the positive lens L3 is arranged so that the convex surface thereof faces the image side. As the negative power of the first lens group G1 increases for widening of the angle of view, the chromatic aberration of magnification caused in the first lens group G1 becomes large. To effectively correct the chromatic aberration of magnification caused in the first lens group G1, in this embodiment the cemented lens CL is arranged in the second lens group G2 in which an off-axis light ray passes through a highest position.

In the following, an object side surface of an optical component and an image side surface of an optical component are referred to as a first surface and a second surface, respectively. The aperture stop S is a plate-like member having a predetermined circular opening having the center on the optical axis AX or is formed as a light-shielding film coated on a lens surface (a second surface r4 of the positive lens L2 in the example of FIG. 2) of the first lens group G1 closest to the apertures stop S, at a part other than a predetermined circular area of the lens surface centering at the optical axis AX. The thickness of the aperture stop S is very thin relative to the thicknesses of the optical lenses, such as the negative lens L1 and the positive lens L2, and can be neglected. Therefore, in this specification, the thickness of the apertures top S is regarded as 0.

When the focal length of the first lens group G1 is defined as $f_F$ (unit: mm), the focal length of an entire system (the combination of the first lens group G1 and the second lens group G2) is defined as f (unit: mm), the radius of curvature of the first surface of the negative lens L1 is defined as $R_1$ (unit: mm), and the radius of curvature of the second surface of the negative lens L1 is defined as $R_2$ (unit: mm), the objective lens 100 for an endoscope is configured to satisfy the following conditions (1) and (2).

$$-3.5 \leq f_F/f \leq -1.5 \quad (1)$$

$$1.3 \leq SF \leq 1.6 \quad (2)$$

where $SF=(R_1+R_2)/(R_1-R_2)$

The condition (1) defines the ratio between the focal length $f_F$ of the first lens group G1 and the focal length f of the entire system. When $f_F/f$ gets larger than the upper limit of the condition (1), it is suitable for downsizing design for the objective lens 100 for an endoscope, but the negative power in the first lens group G1 is excessive. Therefore, in this case, it is difficult to suitably correct the aberrations including the coma and the chromatic aberration when the designer tries to widen the angle of view. Furthermore, since, in this case, it becomes necessary to set the magnification of the second lens group G2 to be high, it becomes difficult to suppress the change of magnification of the second lens group G2 due to an error between the first lens group G1 and the second lens group G2 during assembling. Since the change of the angle of view due to change of the magnification is large, it becomes difficult to ensure the angle of view satisfying requirements.

When $f_F/f$ gets smaller than the lower limit of the condition (1), it is advantageous for correction of the aberrations, but it becomes difficult to design the objective lens 100 for an endoscope to decrease the outer diameter thereof, which is not suitable for downsizing. Furthermore, since, in this case, it is necessary to set the magnification of the first lens group G1 to be high, tilting of an image plane caused when the objective lens is assembled in a state where the first lens group G1 is decentered from the optical axis AX becomes large, and thereby deterioration of the image quality becomes easy to occur in the peripheral portion of the observation field.

The second condition (2) defines the shape of the negative lens L1. When SF gets larger than the upper limit of the condition (2), change of the angle of view is moderate at a peripheral image height (i.e., the magnification becomes very high in the peripheral portion of the observation field), and the peripheral resolution becomes high. Such a state may be suitable because a subject such as a tube wall displayed in the peripheral portion of the observation field can be observed in a high resolution. However, in compensation for this, feeling of insertion which can be obtained when the electronic scope is inserted into a tube cavity (e.g., feeling of insertion which can be obtained during insertion of an electronic scope having an angle of view of 140°) is lost. The feeling of insertion used herein means feeling that the operator obtains, through video displayed on a screen, in regard to how long the electronic scope is inserted into a body cavity. When SF gets larger than the upper limit of the condition (2), flowing of an object, such as a tube wall, displayed in the peripheral portion of the observation field when the electronic scope 1 is inserted into the tube cavity becomes excessively fast, and therefore it is difficult for an operator to recognize the inserted amount of the electronic scope 1. Furthermore, regarding the negative lens L1, the radius of curvature of the first surface becomes small, and the projecting amount of the first surface increases. Therefore, the detergent property deteriorates and the risk that the lens collides with another structural component during management of the electronic scope 1 and thereby the lens is damaged increases. It should be noted that the projecting amount of the first surface is defined as a distance, in the direction of the optical axis AX, between a tangential surface to the first surface on the optical axis AX and the outermost portion of the first surface.

When SF gets smaller than the lower limit of the condition (2), change of the view angle at the peripheral image height is steep (i.e., the magnification in the peripheral portion is low), and the difference in feeling of insertion relative to an existing electronic scope is small. Therefore, treatment of the electronic scope 1 becomes easy. However, in compensation for this, the resolution in the peripheral portion of the observation field in which a subject such as a tube wall is displayed deteriorates, and therefore it is not suitable for observation of a tube cavity. Furthermore, regarding the negative lens L1, the radius of curvature of the first surface becomes large and the projecting amount of the first surface decreases. Therefore, the detergent property is improved and the risk of damage decreases, but loss of light amount becomes easy to occur because of a large incident angle to the first surface.

When both of the conditions (1) and (2) are satisfied, the aberrations including the coma and the chromatic aberration can be suitably corrected even when the objective lens 100 for an endoscope is designed to have a small diameter and to have a wide angle of view. Furthermore, it is possible to maintain the high resolution in the peripheral portion of the observation field without losing feeling of insertion of the existing electronic scope. Furthermore, change of the angle of view and tilting of an image plane due to an assembling error can be effectively suppressed. Furthermore, loss of light amount can be effectively suppressed while improving the detergent property and easiness of treatment. Since an aspherical surface is not essential for correction of the aberrations, a burden on the designer can be reduced and processing becomes easy.

When the focal length of the negative lens L1 is defined as $f_1$, the objective lens 100 for an endoscope may be configured to satisfy the following condition (3).

$$-1.8 \leq f_1/f \leq -1.1 \tag{3}$$

The condition (3) defines the ratio between the focal length of the negative lens L1 and the focal length f of the entire system. When the condition (3) is satisfied, deterioration of the optical performance in the peripheral portion of the observation field which might occur when the angle of view is widened can be suppressed more suitably. When $f_1/f$ gets larger than the upper limit of the condition (3), it becomes difficult to suitably correct the astigmatism and the chromatic aberration and the peripheral resolution decreases because of the strong power of the negative lens L1. When $f_1/f$ gets smaller than the lower limit of the condition (3), power of the negative lens L1 becomes too weak, and such a state is not suitable for design for widening the angle of view while suppressing the effective beam radius.

When the focal length of the positive lens L3 is defined as $f_3$, the objective lens 100 for an endoscope may be configured to satisfy the following condition (4).

$$2.0 \leq f_3/f \leq 4.0 \tag{4}$$

The condition (4) defines the ratio between the focal length $f_3$ of the positive lens L3 and the focal length of the entire system. When the condition (4) is satisfied, it becomes possible to widen the angle of view while maintaining the curvature of field in a suitable state for observing a scheduled subject (e.g., a tube wall of a large intestine). When $f_3/f$ gets larger than the upper limit of the condition (4), Petzval sum becomes large due to the strong positive total power of the objective lens 100 for an endoscope, and the image plane tends to tilt to an under condition when the diameter of a tube cavity of an observation target is thin. Therefore, the resolution in the peripheral portion of the observation field in which a subject such as a tube wall is displayed decreases, and it becomes difficult to observe the tube wall as a fine video. When $f_3/f$ gets smaller than the lower limit of the condition (4), Petzval sum becomes small and the image plane tends to tilt to an over condition when the diameter of the tube cavity for an observation target is thick, because the total positive power of the objective lens 100 for an endoscope is weak. Therefore, the resolution in the peripheral portion of the observation field in which a subject such as a tube wall is displayed decreases, and it becomes difficult to observe a subject such as a tube wall in a fine video. In order to correct the image plane tilted in the over condition, it becomes necessary to set the curvature radius of the cemented surface to be small to increase the power of the negative lens 4 constituting the cemented lens CL. In this case, there is a drawback that workability deteriorates. When the diameter of the tube cavity is defined as φ and the maximum image height in the imaging plane (the light reception surface of the solid state image puck-up device) is defined as y, the range of the diameter of a tube cavity to be observed in the embodiment is as follows.

$$10y \leq \phi \leq 20y$$

When an intermediate image height lower than the maximum image height y is defined as $y_i$, a half view angle corresponding to the maximum image height y is defined as $\omega_m$, and a half view angle corresponding to the intermediate image height yi is defined as $\omega_i$, the objective lens 100 for an endoscope may be configured to satisfy the following condition (5).

$$1.3 \times \sin(\omega_i/1.3) \leq y_i/f \leq 3.0 \times \sin(\omega_i/3.0) \tag{5}$$

where $60° \leq \omega_i \leq \omega_m$

The half view angle defining the condition (5) is defined as a tilting angle formed between an incident light ray incident on the surface (the first surface of the negative lens 11) closest to the object side in the objective lens 100 for an endoscope and the optical axis AX.

Figure 21:
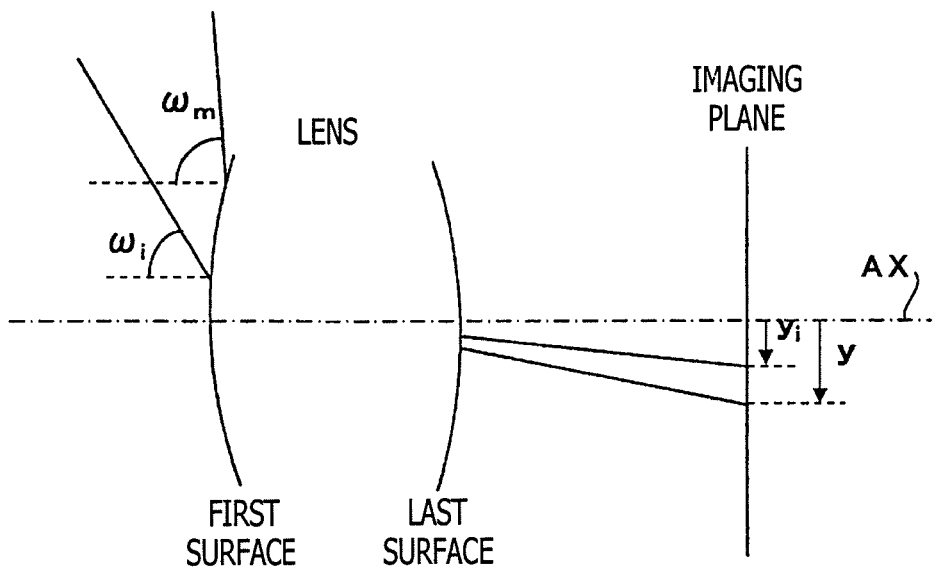
FIG. 21 is a diagram illustrating a relationship between the image height and the view angle defining the condition (5) in the example 6 of the invention.

FIG. 21 illustrates the relationship between the image height and the view angle defining the condition (5). In FIG. 21, the surface (the first surface of the negative lens L1) closest to the object side in the objective lens 100 for an endoscope and the surface (the second surface of the positive lens L5 constituting the cemented lens CL) closest to the image side in the objective lens 100 for an endoscope are defined as a first surface and a last surface, respectively. The range of field from the half view angle of $\omega_i$ to $\omega_m$ is a region of regard in which the subject such as the tube wall can be viewed during observation of a tube cavity. Hereafter, this filed range is referred to as a "tube wall field area". An area on the imaging plane corresponding to the tube wall field area (an area from the intermediate image height $y_i$ to the outermost portion of the effective pixel area) is referred to as a "tube wall imaging area". When $y_i/f$ gets larger than the upper limit of the condition (5), the tube wall imaging area is wide, and the subject in the tube wall imaging area can be imaged in a high resolution. However, in compensation for this, deterioration of the resolution in the central portion in the filed inside of the tube wall field area cannot be avoided. For example, when the diseased part is found and the image is moved to the field center, it becomes impossible to image the diseased part in a high resolution. When $y_i/f$ gets smaller than the lower limit of the condition (5), the tube wall imaging area is small, and it becomes impossible to image the subject in the tube wall field area in a high resolution, and such a state is not suitable for observation of a tube cavity. When the condition (5) is satisfied, it becomes possible to image the subject in the tube wall field area in a high resolution, and to effectively avoid deterioration of the resolution in the central portion of the field.

Since the first surface of the negative lens L1 is exposed to the outside of the tip portion 12, the first surface is washed with a cleaning agent after the endoscopic diagnosis. Among cleaning agents, there is an agent containing a constituent which deteriorates the surface processing. Therefore, no anti-reflection coating is provided on the first surface of the negative lens L1. As a result, there is a concern about loss of light amount by surface reflection. For this reason, the objective lens 100 for an endoscope may be configured to satisfy the following condition (6).

$$\theta \leq 75° \tag{6}$$

The incident angle $\theta$ satisfying the condition (6) is defined as an incident angle of a light ray entering to a point of the maximum image height y with respect to the first surface of the negative lens L1. The incident angle is defined as an angle formed between an incident light ray and a normal to a tangential surface at an intersection point between the incident light ray and the incident surface.

When the condition (6) is satisfied, loss of light amount by surface reflection can be effectively suppressed. When $\theta$ stays away from the condition (6), the surface reflection exceeding 30% occurs if a high refractive index glass material having a refractive index larger than 1.8 is used for the negative lens L1. That is, the range of choice for lens materials narrows, which is not desirable.

The objective lens 100 for an endoscope may be configured to satisfy the following condition (7).

$$2.0 \leq R_1/y \leq 5.5 \tag{7}$$

When the condition (7) is satisfied, it is possible to effectively suppress loss of light amount by the surface reflection on the first surface of the negative lens while securing an adequate peripheral thickness of the negative lens L1. By securing the adequate peripheral thickness of the negative lens L1, the inside of the tip portion 12 can be insulated from the outside via a material having an adequate thickness and having a low dielectric constant. When $R_1/y$ gets larger than the upper limit of the condition (7), it becomes difficult to secure a peripheral thickness adequate for ensuring a sufficient insulating property. Furthermore, in this case, the incident angle to the first surface of the negative lens L1 is large. Therefore, the loss of light amount by the surface reflection increases. When $R_1/y$ gets smaller than the lower limit of the condition (7), the projecting amount of the first surface of the negative lens L1 increases, and thereby the detergent property deteriorates and the risk that the electronic scope 1 is damaged by collision with another structural component during management of the electronic scope 1. Furthermore, it becomes necessary to set the radius of curvature of the second surface of the negative lens L1 to be small, which deteriorates workability, When the effective beam radius of the negative lens L1 at the maximum image height y is defined as D, the objective lens 100 for an endoscope may be configured to satisfy the following condition (8).

$$2.0 \leq D/y \leq 3.0 \tag{8}$$

When the condition (8) is satisfied, it is possible to suppress loss of light amount by the surface reflection, while suppressing the projecting amount of the negative lens L1. When D/y gets larger than the upper limit of the condition (8), the projecting amount of the first surface of the negative lens L1 can be suppressed, but the loss of light amount by the surface reflection increases because the incident angle to the first surface is large. Furthermore, it is difficult to suppress the entire length (the size in the direction of the optical axis AX) of the objective lens 100 for an endoscope, and such a state is not suitable for downsizing of the tip portion. When D/y gets smaller than the lower limit of the condition (8), the loss of light amount by the surface refection on the first surface of the negative lens L1 can be suppressed, but the projecting amount of the first surface becomes large. Therefore, the detergent property deteriorates and the risk that the electronic scope 1 collides with another structural component and is damaged during management of the electronic scope 1 increases.

In the following, six concrete numerical examples of the objective lens 100 for an endoscope described above are explained. The objective lens 100 for an endoscope according to each of examples 1 to 6 is arranged in the tip portion 12 of the electronic scope 1 shown in FIG. 1.

Example 1

As described above, the objective lens 100 for an endoscope according the example 1 of the invention is shown in FIG. 2. Table 1 shows a concrete numeric configuration (design values) of the objective lens 100 for an endoscope (and optical components arranged on the rear side thereof) according to the example 1. In Table 1, the surface number n corresponds to the surface reference rn in FIG. 2, excepting the surface number 5 for the aperture stop S. In Table 1, R (unit: mm) denotes the radius of curvature of each surface an optical component, D (unit: mm) denotes a thickness of an optical component or an interval between optical components, N(d) denotes an refractive index at d-line (wavelength of 588 nm), and νd denotes Abbe number at d-line. Table 2 shows specifications (F number, the focal length (unit: mm) of the entire system, the optical magnification, half view angle (unit: deg), and the image height (unit: mm)) of the objective lens 100 for an endoscope.

TABLE 1

| No. | R | D | N(d) | νd |
|---|---|---|---|---|
| 1 | 5.243 | 0.629 | 1.88300 | 40.8 |
| 2 | 0.850 | 0.499 | | |
| 3 | INFINITY | 1.128 | 1.92286 | 18.9 |
| 4 | −9.978 | 0.065 | | |
| 5 | INFINITY | 0.087 | | |
| Aperture stop | | | | |
| 6 | −4.069 | 1.085 | 1.77250 | 49.6 |
| 7 | −1.343 | 0.629 | | |

TABLE 1-continued

| No. | R | D | N(d) | vd |
|---|---|---|---|---|
| 8 | 3.698 | 0.325 | 1.92286 | 18.9 |
| 9 | 1.511 | 1.410 | 1.69680 | 55.5 |
| 10 | −3.579 | 0.614 | | |
| 11 | INFINITY | 1.085 | 1.51633 | 64.1 |
| 12 | INFINITY | 0.325 | 1.51000 | 64.1 |
| 13 | INFINITY | — | | |

TABLE 2

| F NUMBER | 5.6 | FOCAL LENGTH | 1.00 |
|---|---|---|---|
| MAGNIFICATION | −0.085 | IMAGE HEIGHT | 1.37 |
| HALF VIEW ANGLE | 89.2 | | |

Figure 3:
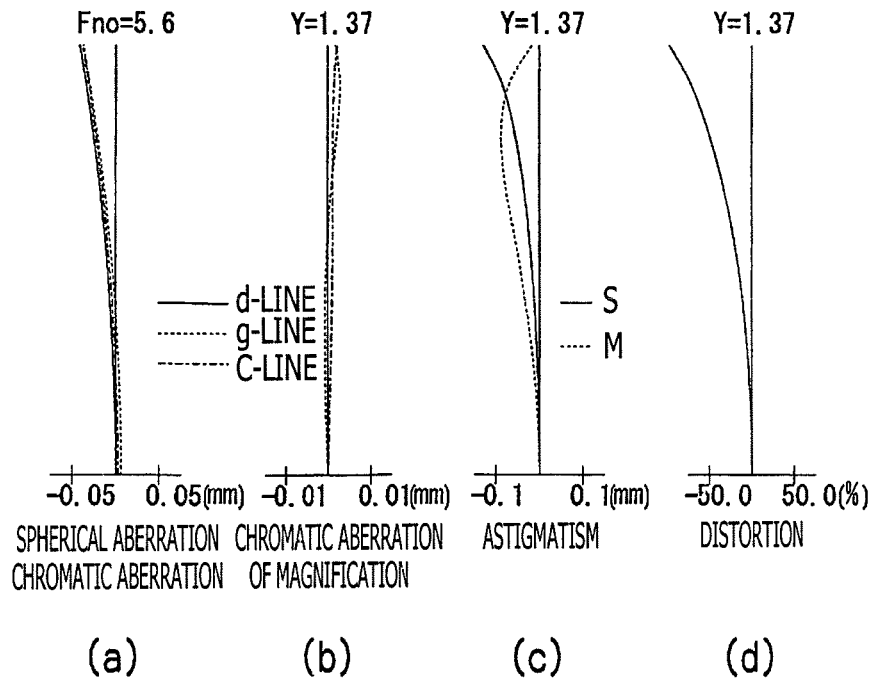
FIG. 3 is an aberration diagram of the objective lens for an endoscope according to the example 1 of the invention.

FIGS. 3(a) to 3(d) are aberration diagrams of the objective lens 100 for an endoscope according to the example 1. Specifically, FIG. 3(a) shows the spherical aberration and the longitudinal chromatic aberration at d-line, g-line (436 nm) and C-line (656 nm). FIG. 3(b) shows the chromatic aberration of magnification at d-line, g-line and C-line. In each of FIGS. 3(a) and 3(b), a solid line represents the aberration at d-line, a dotted line represents the aberration at g-line, and a chain line represents the aberration at C-line. FIG. 3(c) shows the astigmatism. In FIG. 3(c), a solid line shows a sagittal component, and a dotted line shows a meridional component. FIG. 3(d) shows the distortion. In each of FIGS. 3(a) to 3(c), the vertical axis represents the image height, and the horizontal axis represents the amount of aberration. In FIG. 3(d), the vertical axis represents the image height, and the horizontal axis represents the distortion. As shown in Tables 1 and 2 and FIGS. 3(a) to 3(d), the objective lens 100 for an endoscope according to the example 1 suitably corrects the aberrations while being configured to be compact in size and to have a wide angle of view. It should be noted that the explanations regarding the tables and the drawings of the example 1 also apply to tables and drawings presented in the following numeric examples.

Example 2

Figure 4:
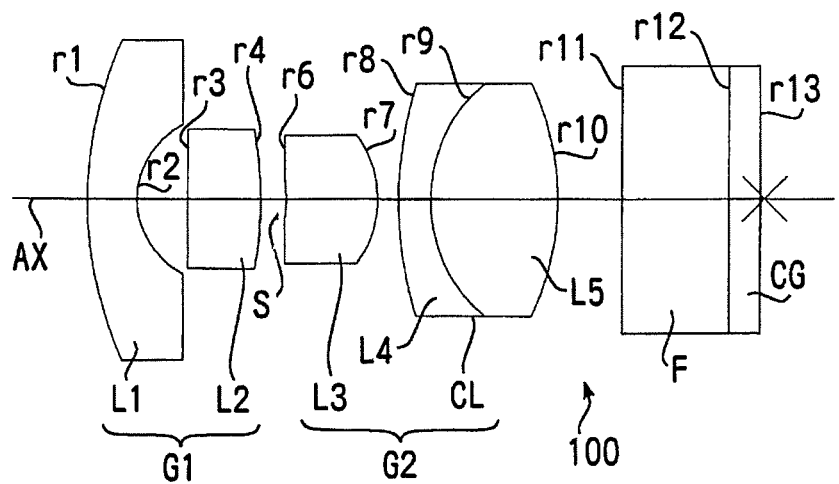
FIG. 4 is a cross sectional view illustrating an arrangement of the objective lens for an endoscope and optical components provided on the rear side of the objective lens according to an example 2 of the invention.
Figure 5:
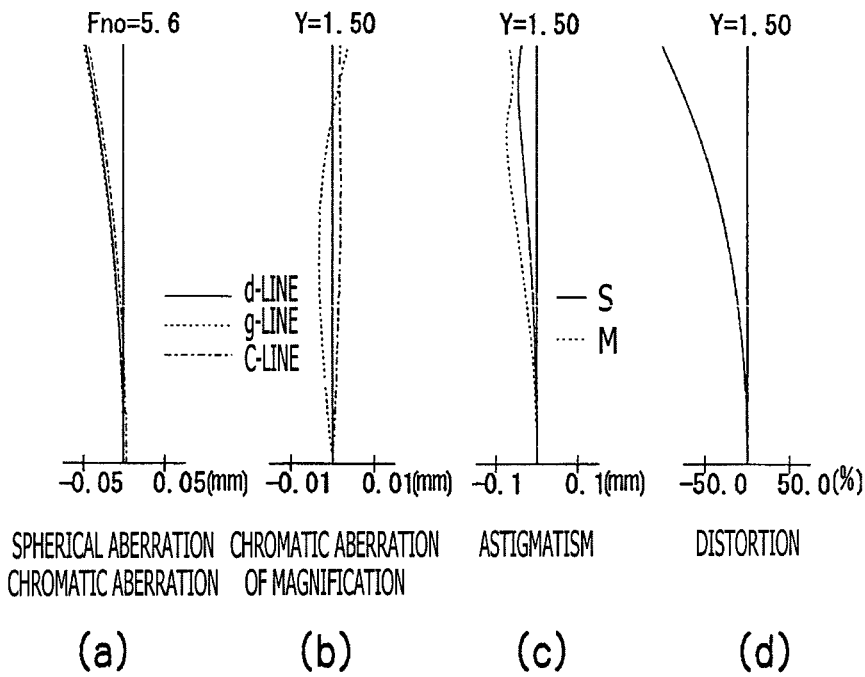
FIG. 5 is an aberration diagram of the objective lens for an endoscope according to the example 2 of the invention.

FIG. 4 is a cross sectional view illustrating the arrangement of the optical components including the objective lens 100 for an endoscope according to the example 2. As shown in FIG. 4, the objective lens 100 for an endoscope according to the example 2 has the same number of lenses as that of the objective lens 100 for an endoscope according to the example 1. FIGS. 5(a) to 5(d) are aberration diagrams (the spherical aberration, the longitudinal chromatic aberration, the chromatic aberration of magnification, the astigmatism, and the distortion) of the objective lens 100 for an endoscope according to the example 2. Table 3 shows an concrete numeric configuration of the optical components including the objective lens 100 for an endoscope according to the example 2, and Table 4 shows specifications of the objective lens 100 for an endoscope according to the example 2. As shown in Tables 3 and 4 and FIGS. 5(a) to 5(d), the objective lens 100 for an endoscope according to the example 2 suitably corrects the aberrations while being configured to be compact in size and to have a wide angle of view.

TABLE 3

| No. | R | D | N(d) | vd |
|---|---|---|---|---|
| 1 | 4.159 | 0.572 | 1.88300 | 40.8 |
| 2 | 0.922 | 0.575 | | |
| 3 | INFINITY | 0.819 | 1.92286 | 18.9 |
| 4 | −4.537 | 0.184 | | |
| 5 | INFINITY | 0.095 | | |
| Aperture stop | | | | |
| 6 | −1.483 | 1.020 | 1.72916 | 54.7 |
| 7 | −1.162 | 0.239 | | |
| 8 | 4.282 | 0.363 | 1.92286 | 18.9 |
| 9 | 1.669 | 1.432 | 1.72916 | 54.7 |
| 10 | −2.952 | 0.725 | | |
| 11 | INFINITY | 1.189 | 1.51633 | 64.1 |
| 12 | INFINITY | 0.357 | 1.51000 | 64.1 |
| 13 | INFINITY | — | | |

TABLE 4

| F NUMBER | 5.6 | FOCAL LENGTH | 1.00 |
|---|---|---|---|
| MAGNIFICATION | −0.078 | IMAGE HEIGHT | 1.50 |
| HALF VIEW ANGLE | 89.8 | | |

Example 3

Figure 6:
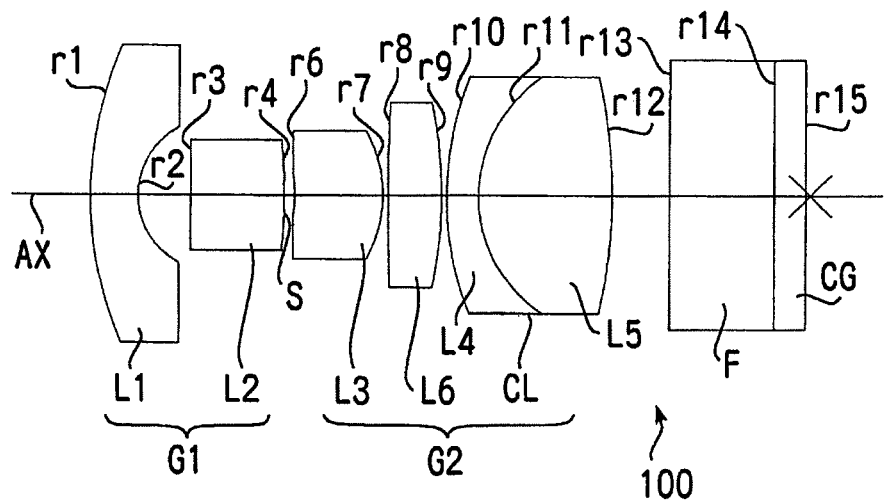
FIG. 6 is a cross sectional view illustrating an arrangement of the objective lens for an endoscope and optical components provided on the rear side of the objective lens according to an example 3 of the invention.
Figure 7:
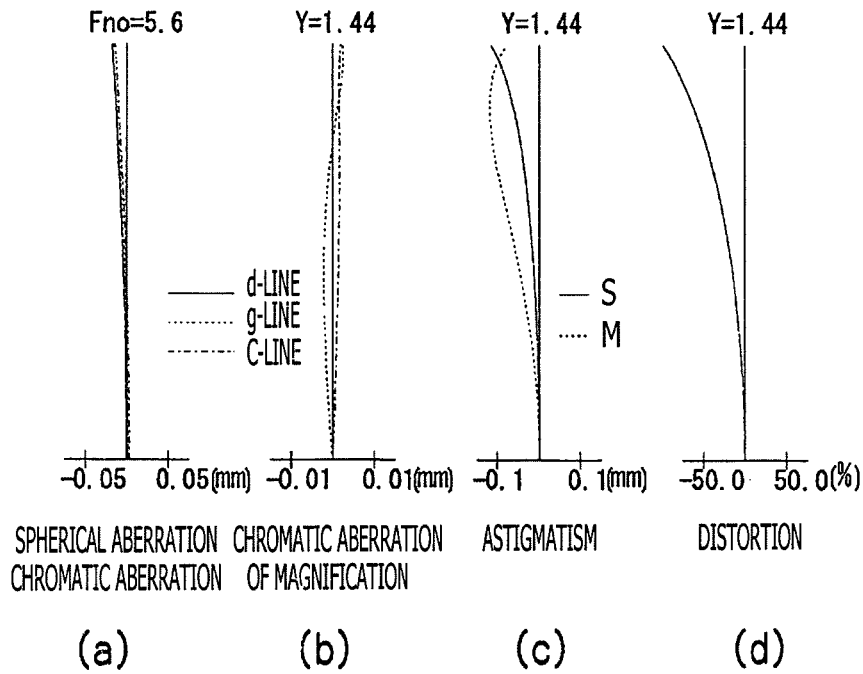
FIG. 7 is an aberration diagram of the objective lens for an endoscope according to the example 3 of the invention.

FIG. 6 is a cross sectional view illustrating the arrangement of the optical components including the objective lens 100 for an endoscope according to the example 3. As shown in Table 3 indicated below, the objective lens 100 for an endoscope according to the example 3 has a half view angle exceeding 95°. Therefore, it is difficult to suitably correct the curvature of field if the lens arrangement is the same as that of the example 1 or 2. For this reason, as shown in FIG. 6, a positive lens L6 is arranged between the positive lens L3 and the cemented lens CL so as to suitably correct the curvature of field. That is, in the example 3, the second lens group G2 has three lenses including the positive lens L3, the positive lens L6 and the cemented lens CL. The first lens group G1 has the same number of lenses as that of the first lens group G1 of the example 1. FIGS. 7(a) to 7(d) are aberration diagrams (the spherical aberration, the longitudinal chromatic aberration, the chromatic aberration of magnification, the astigmatism, and the distortion) of the objective lens 100 for an endoscope according to the example 3. Table 5 shows an concrete numeric configuration of the optical components including the objective lens 100 for an endoscope according to the example 3, and Table 6 shows specifications of the objective lens 100 for an endoscope according to the example 3. As shown in Tables 5 and 6 and FIGS. 7(a) to 7(d), the objective lens 100 for an endoscope according to the example 3 suitably corrects the aberrations while being configured to be compact in size and to have a wide angle of view.

TABLE 5

| No. | R | D | N(d) | vd |
|---|---|---|---|---|
| 1 | 3.942 | 0.515 | 1.88300 | 40.8 |
| 2 | 0.834 | 0.565 | | |
| 3 | INFINITY | 1.027 | 1.92286 | 18.9 |
| 4 | −5.772 | 0.005 | | |
| 5 | INFINITY | 0.103 | | |
| Aperture stop | | | | |
| 6 | −1.808 | 0.965 | 1.72916 | 54.7 |
| 7 | −1.396 | 0.057 | | |
| 8 | 25.359 | 0.582 | 1.51633 | 64.1 |
| 9 | −4.759 | 0.057 | | |
| 10 | 3.379 | 0.343 | 1.92286 | 18.9 |

TABLE 5-continued

| No. | R | D | N(d) | vd |
|---|---|---|---|---|
| 11 | 1.543 | 1.440 | 1.72916 | 54.7 |
| 12 | −5.612 | 0.636 | | |
| 13 | INFINITY | 1.144 | 1.51633 | 64.1 |
| 14 | INFINITY | 0.343 | 1.51000 | 64.1 |
| 15 | INFINITY | — | | |

TABLE 6

| F NUMBER | 5.6 | FOCAL LENGTH | 1.00 |
|---|---|---|---|
| MAGNIFICATION | −0.082 | IMAGE HEIGHT | 1.44 |
| HALF VIEW ANGLE | 97.2 | | |

Example 4

Figure 8:
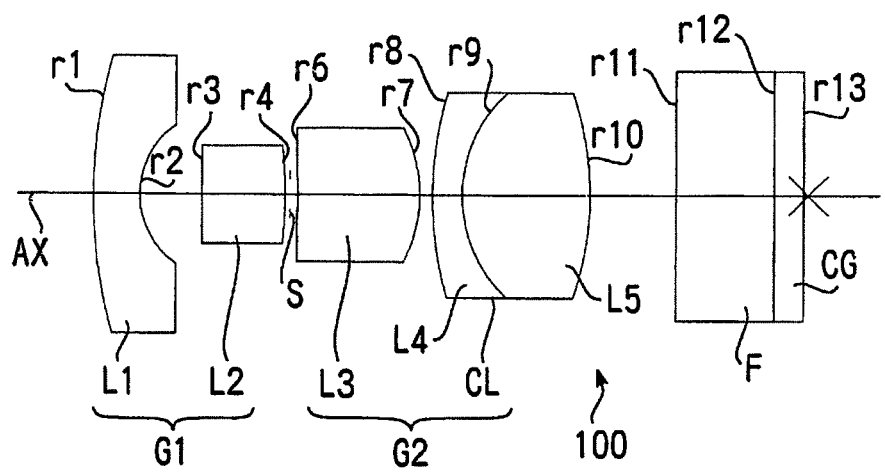
FIG. 8 is a cross sectional view illustrating an arrangement of the objective lens for an endoscope and optical components provided on the rear side of the objective lens according to an example 4 of the invention.
Figure 9:
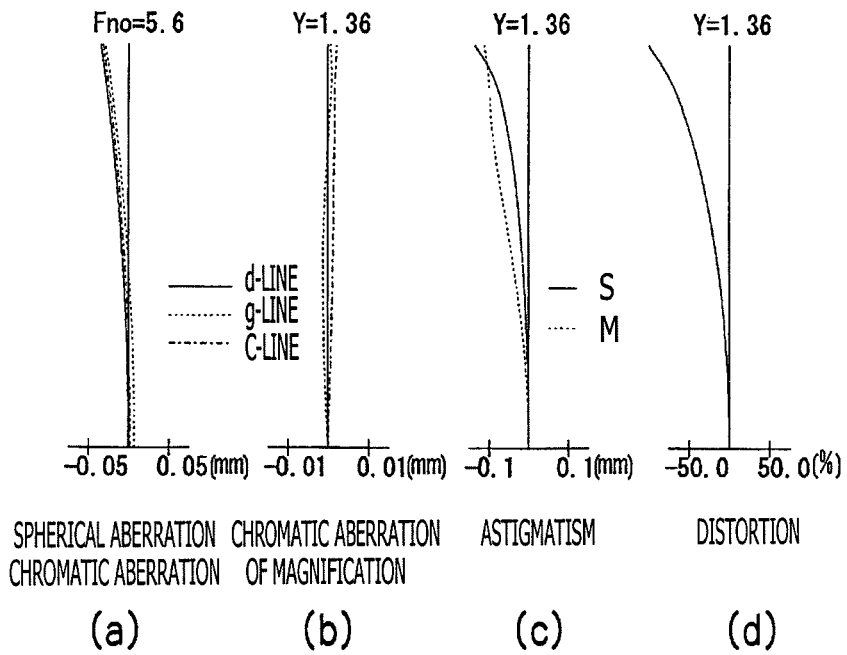
FIG. 9 is an aberration diagram of the objective lens for an endoscope according to the example 4 of the invention.

FIG. 8 is a cross sectional view illustrating the arrangement of the optical components including the objective lens 100 for an endoscope according to the example 4. As shown in FIG. 8, the objective lens 100 for an endoscope according to the example 4 has the same number of lenses as that of the objective lens 100 for an endoscope according to the example 1. FIGS. 9(a) to 9(d) are aberration diagrams (the spherical aberration, the longitudinal chromatic aberration, the chromatic aberration of magnification, the astigmatism, and the distortion) of the objective lens 100 for an endoscope according to the example 2. Table 7 shows a concrete numeric configuration of the optical components including the objective lens 100 for an endoscope according to the example 4, and Table 8 shows specifications of the objective lens 100 for an endoscope according to the example 4. As shown in Tables 7 and 8 and FIGS. 9(a) to 9(d), the objective lens 100 for an endoscope according to the example 4 suitably corrects the aberrations while being configured to be compact in size and to have a wide angle of view.

TABLE 7

| No. | R | D | N(d) | vd |
|---|---|---|---|---|
| 1 | 5.405 | 0.510 | 1.88300 | 40.8 |
| 2 | 0.897 | 0.689 | | |
| 3 | INFINITY | 0.921 | 1.92286 | 18.9 |
| 4 | −4.052 | 0.056 | | |
| 5 | INFINITY | 0.086 | | |
| Aperture stop | | | | |
| 6 | −2.691 | 1.319 | 1.77250 | 49.6 |
| 7 | −1.518 | 0.138 | | |
| 8 | 4.086 | 0.324 | 1.92286 | 18.9 |
| 9 | 1.500 | 1.405 | 1.69680 | 55.5 |
| 10 | −3.455 | 0.949 | | |
| 11 | INFINITY | 1.081 | 1.51633 | 64.1 |
| 12 | INFINITY | 0.324 | 1.51000 | 64.1 |
| 13 | INFINITY | — | | |

TABLE 8

| F NUMBER | 5.6 | FOCAL LENGTH | 1.00 |
|---|---|---|---|
| MAGNIFICATION | −0.086 | IMAGE HEIGHT | 1.36 |
| HALF VIEW ANGLE | 89.9 | | |

Example 5

Figure 10:
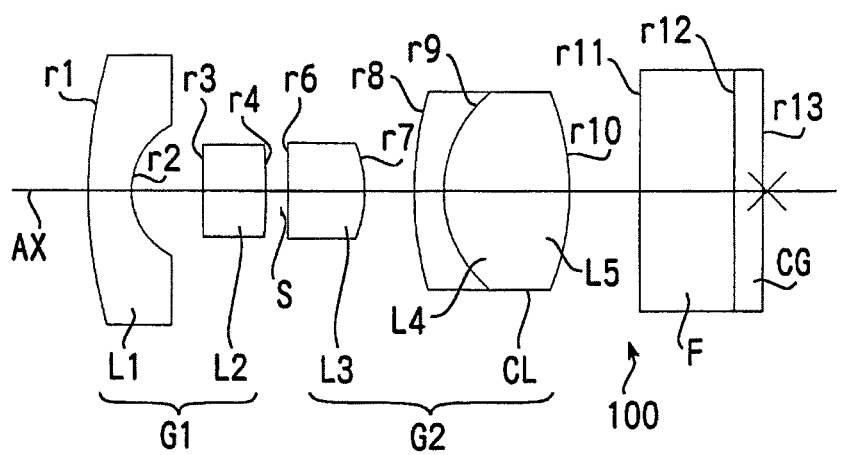
FIG. 10 is a cross sectional view illustrating an arrangement of the objective lens for an endoscope and optical components provided on the rear side of the objective lens according to an example 5 of the invention.
Figure 11:
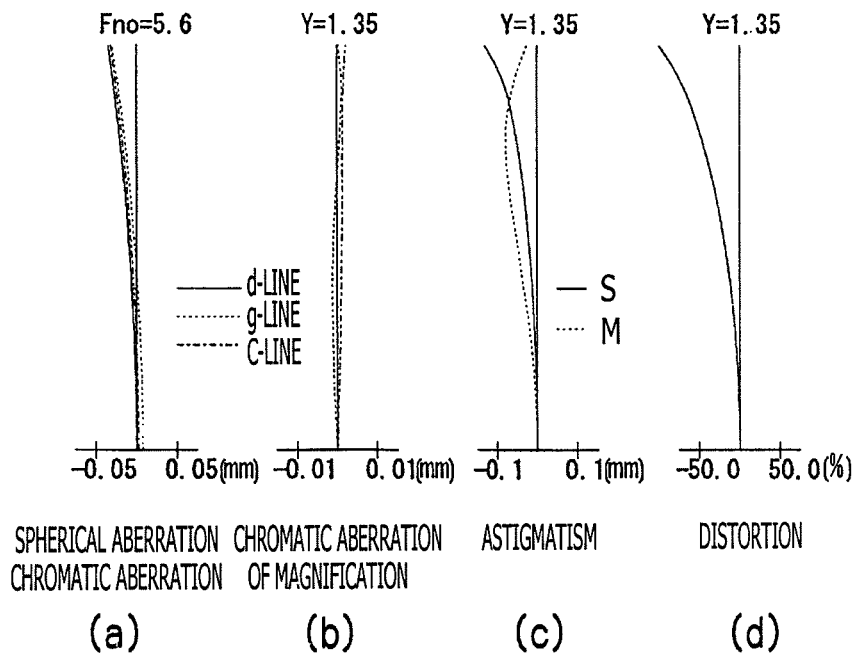
FIG. 11 is an aberration diagram of the objective lens for an endoscope according to the example 5 of the invention.

FIG. 10 is a cross sectional view illustrating the arrangement of the optical components including the objective lens 100 for an endoscope according to the example 5. As shown in FIG. 10, the objective lens 100 for an endoscope according to the example 5 has the same number of lenses as that of the objective lens 100 for an endoscope according to the example 1. FIGS. 11(a) to 11(d) are aberration diagrams (the spherical aberration, the longitudinal chromatic aberration, the chromatic aberration of magnification, the astigmatism, and the distortion) of the objective lens 100 for an endoscope according to the example 5. Table 9 shows a concrete numeric configuration of the optical components including the objective lens 100 for an endoscope according to the example 5, and Table 10 shows specifications of the objective lens 100 for an endoscope according to the example 5. As shown in Tables 9 and 10 and FIGS. 11(a) to 11(d), the objective lens 100 for an endoscope according to the example 5 suitably corrects the aberrations while being configured to be compact in size and to have a wide angle of view.

TABLE 9

| No. | R | D | N(d) | vd |
|---|---|---|---|---|
| 1 | 5.365 | 0.483 | 1.88300 | 40.8 |
| 2 | 0.822 | 0.815 | | |
| 3 | INFINITY | 0.719 | 1.92286 | 18.9 |
| 4 | −6.331 | 0.172 | | |
| 5 | INFINITY | 0.086 | | |
| Aperture stop | | | | |
| 6 | −4.964 | 0.858 | 1.77250 | 49.6 |
| 7 | −1.490 | 0.558 | | |
| 8 | 4.178 | 0.322 | 1.92286 | 18.9 |
| 9 | 1.449 | 1.395 | 1.69680 | 55.5 |
| 10 | −2.948 | 0.797 | | |
| 11 | INFINITY | 1.073 | 1.51633 | 64.1 |
| 12 | INFINITY | 0.322 | 1.51000 | 64.1 |
| 13 | INFINITY | — | | |

TABLE 10

| F NUMBER | 5.6 | FOCAL LENGTH | 1.00 |
|---|---|---|---|
| MAGNIFICATION | −0.078 | IMAGE HEIGHT | 1.35 |
| HALF VIEW ANGLE | 89.8 | | |

Example 6

Figure 12:
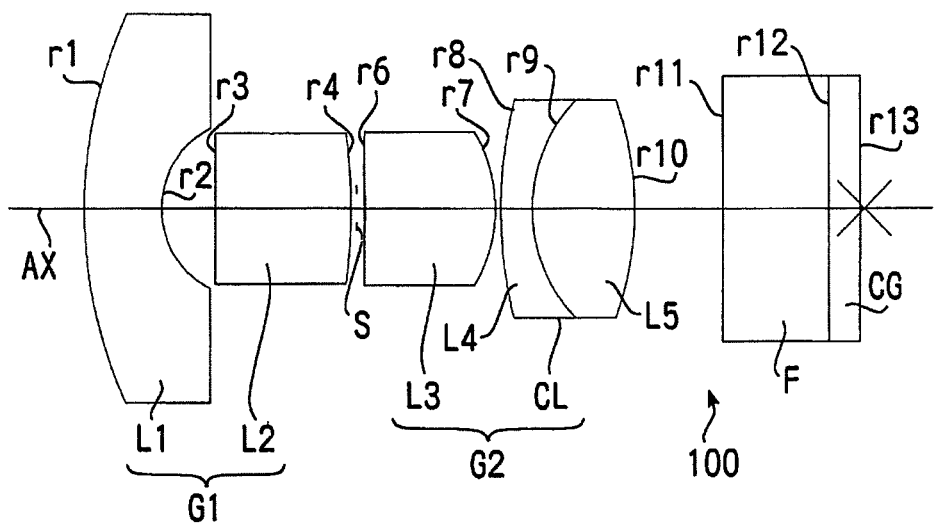
FIG. 12 is a cross sectional view illustrating an arrangement of the objective lens for an endoscope and optical components provided on the rear side of the objective lens according to an example 6 of the invention.
Figure 13:
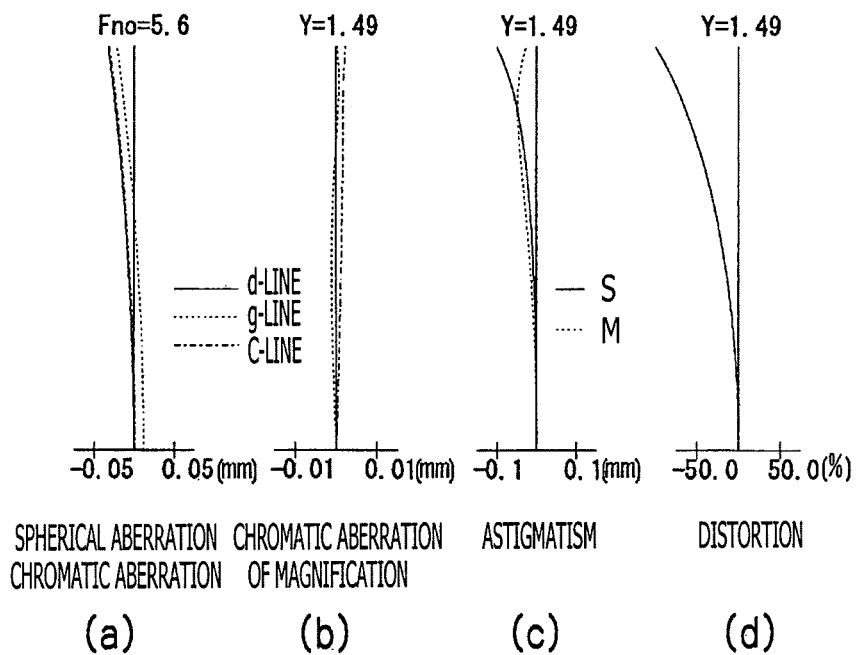
FIG. 13 is an aberration diagram of the objective lens for an endoscope according to the example 6 of the invention.
Figure 14:
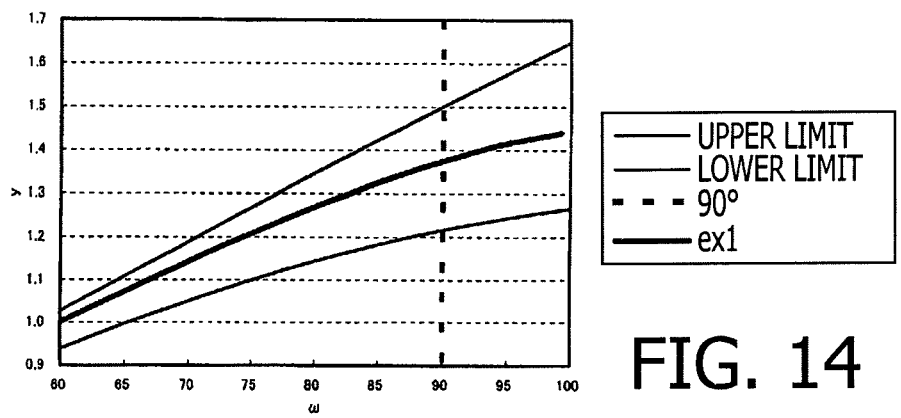
FIG. 14 is a diagram illustrating a relationship between an image height and a view angle defining a condition (5) in the example 1 of the invention.
Figure 15:
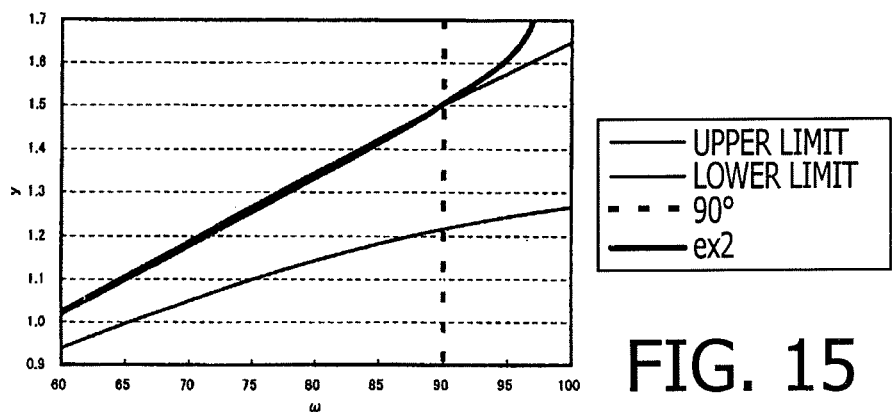
FIG. 15 is a diagram illustrating a relationship between the image height and the view angle defining the condition (5) in the example 2 of the invention.
Figure 16:
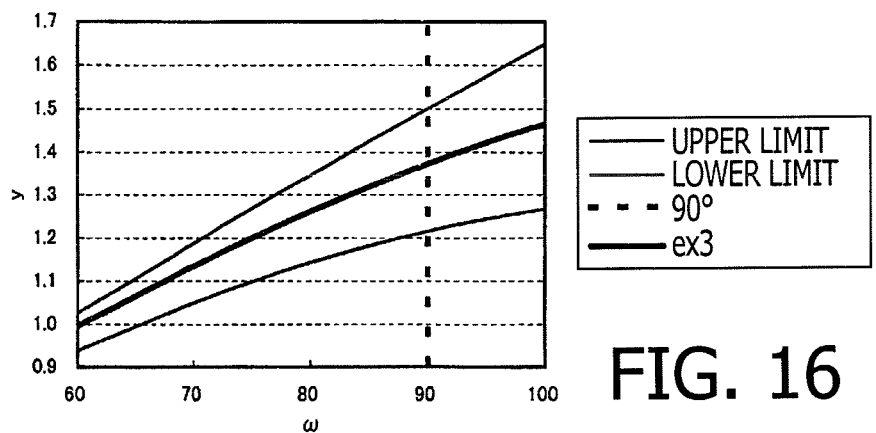
FIG. 16 is a diagram illustrating a relationship between the image height and the view angle defining the condition (5) in the example 3 of the invention.
Figure 17:
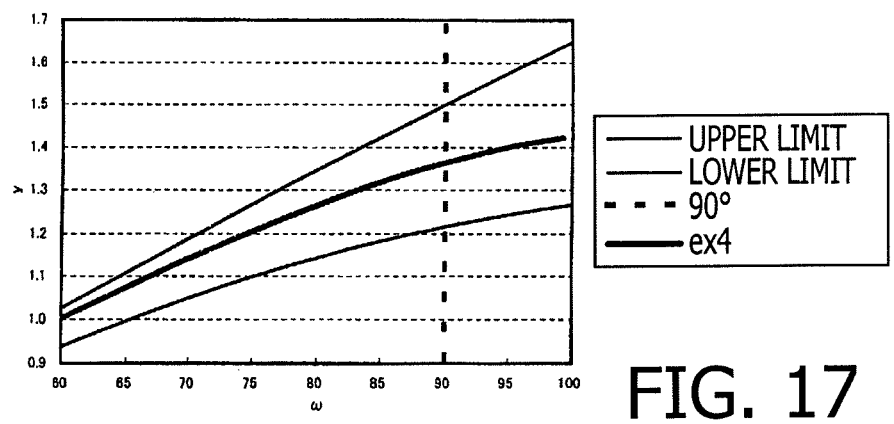
FIG. 17 is a diagram illustrating a relationship between the image height and the view angle defining the condition (5) in the example 4 of the invention.
Figure 18:
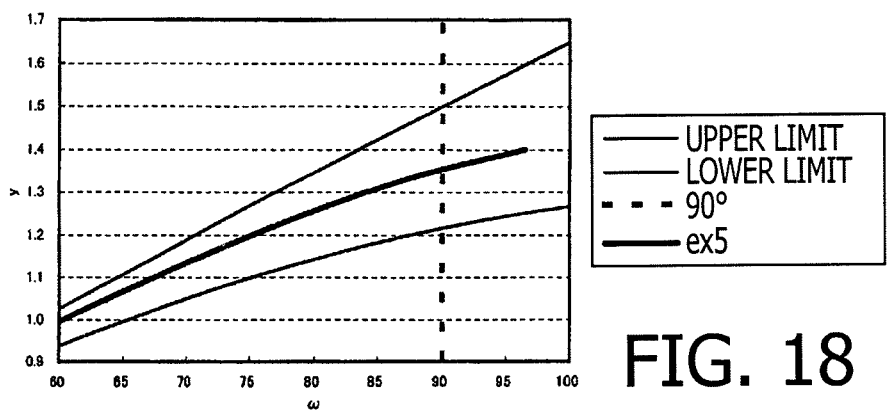
FIG. 18 is a diagram illustrating a relationship between the image height and the view angle defining the condition (5) in the example 5 of the invention.

FIG. 12 is a cross sectional view illustrating the arrangement of the optical components including the objective lens 100 for an endoscope according to the example 6. As shown in FIG. 12, the objective lens 100 for an endoscope according to the example 6 has the same number of lenses as that of the objective lens 100 for an endoscope according to the example 1. FIGS. 13(a) to 13(d) are aberration diagrams (the spherical aberration, the longitudinal chromatic aberration, the chromatic aberration of magnification, the astigmatism, and the distortion) of the objective lens 100 for an endoscope according to the example 6. Table 11 shows a concrete numeric configuration of the optical components including the objective lens 100 for an endoscope according to the example 6, and Table 12 shows specifications of the objective lens 100 for an endoscope according to the example 6. As shown in Tables 11 and 12 and FIGS. 13(a) to 13(d), the objective lens 100 for an endoscope according to the example 6 suitably corrects the aberrations while being configured to be compact in size and to have a wide angle of view.

TABLE 11

| No. | R | D | N(d) | νd |
|---|---|---|---|---|
| 1 | 5.217 | 0.861 | 1.88300 | 40.8 |
| 2 | 1.000 | 0.609 | | |
| 3 | INFINITY | 1.535 | 1.92286 | 18.9 |
| 4 | −5.935 | 0.062 | | |
| 5 | INFINITY | 0.094 | | |
| Aperture stop | | | | |
| 6 | −3.191 | 1.454 | 1.77250 | 49.6 |
| 7 | −1.651 | 0.059 | | |
| 8 | 4.769 | 0.354 | 1.92286 | 18.9 |
| 9 | 1.728 | 1.163 | 1.72916 | 54.7 |
| 10 | −3.622 | 0.983 | | |
| 11 | INFINITY | 1.181 | 1.51633 | 64.1 |
| 12 | INFINITY | 0.543 | 1.51000 | 64.1 |
| 13 | INFINITY | — | | |

TABLE 12

| F NUMBER | 5.6 | FOCAL LENGTH | 1.00 |
|---|---|---|---|
| MAGNIFICATION | −0.077 | IMAGE HEIGHT | 1.49 |
| HALF VIEW ANGLE | 90.0 | | |

(Comparison)

Table 13 is a list of values obtained by applying the conditions to seven examples including the examples 1 to 6 and a comparative example 1, excepting the condition (5). Regarding the condition 85), FIGS. 14 to 20 shows the relationships between the image height and the view angle for the examples. The comparative example 1 is an example 1 shown in patent document 1.

TABLE 13

| | EXAMPLE 1 | EXAMPLE 2 | EXAMPLE 3 | EXAMPLE 4 | EXAMPLE 5 | EXAMPLE 6 | COMPARATIVE EXAMPLE 1 |
|---|---|---|---|---|---|---|---|
| CONDITION (1) | −1.54 | −2.82 | −2.06 | −2.84 | −1.74 | −2.77 | −1.75 |
| CONDITION (2) | 1.37 | 1.57 | 1.54 | 1.40 | 1.36 | 1.47 | 1.00 |
| CONDITION (3) | −1.22 | −1.46 | −1.30 | −1.29 | −1.16 | −1.55 | −1.02 |
| CONDITION (4) | 2.21 | 3.14 | 2.12 | 3.02 | 2.49 | 3.14 | 2.51 |
| CONDITION (6) | 74° | 66° | 75° | 75° | 75° | 67° | 66° |
| CONDITION (7) | 3.97 | 2.80 | 2.70 | 4.00 | 4.00 | 3.51 | ∞ |
| CONDITION (8) | 2.30 | 2.40 | 2.20 | 2.20 | 2.20 | 2.90 | 1.90 |

As shown in Table 13, the objective lens 100 for an endoscope according to each of the examples 1 to 6 satisfies the conditions (1) and (2) simultaneously, and suitably corrects the aberrations while being configured to be compact in size and to have a wide angle of view, as shown in the drawings and tables described in the above examples. By contrast, as shown in Table 13, the objective lens for an endoscope according to the comparative example 1 does not satisfy the condition (2). Therefore, when the comparative example 1 is designed to maintain the optical performance while suppressing the outer shape, it becomes difficult to widen the angle of view. In another aspect, in order to widen the angle of view in the comparative example 1 (e.g., to obtain the angle of view exceeding 140°), it is necessary to sacrifice at least one of the optical performance and downsizing. For example, when the optical performance is sacrificed, it is impossible to avoid significant decrease of the resolution in the peripheral area of the observation field in which a subject such as a tube wall is displayed.

As shown in Table 13, the objective lens 100 for an endoscope according to each of the examples 1 to 6 satisfies the conditions (3), (4) and (6) to (8). Therefore, each of the examples 1 to 6 achieves further advantages by satisfying these conditions. By contrast, as shown in Table 13, the objective lens for an endoscope according to the comparative example 1 does not satisfy the conditions (3), (7) and 88). In the comparative example 1, it is difficult to suitably correct the astigmatism and the chromatic aberration, and therefore the resolution may further decreases in the peripheral area of the observation field, because the comparative example 1 exceeds, for example, the upper limit of the condition (3).

Figure 19:
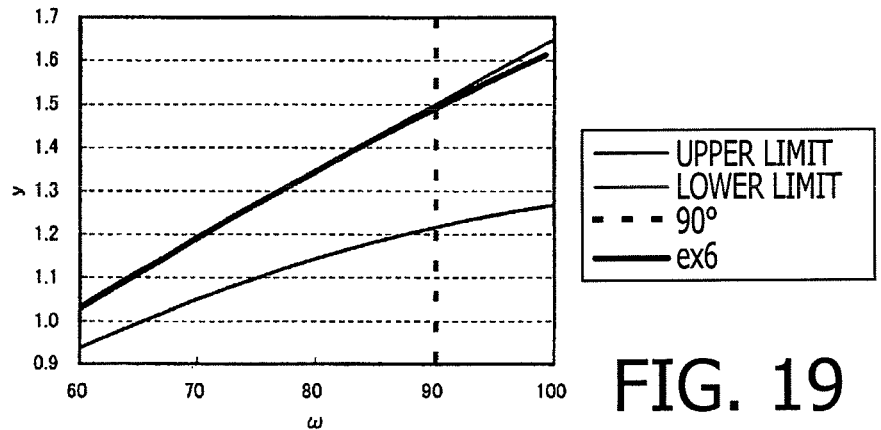
FIG. 19 is a diagram illustrating a relationship between the image height and the view angle defining the condition (5) in the example 6 of the invention.
Figure 20:
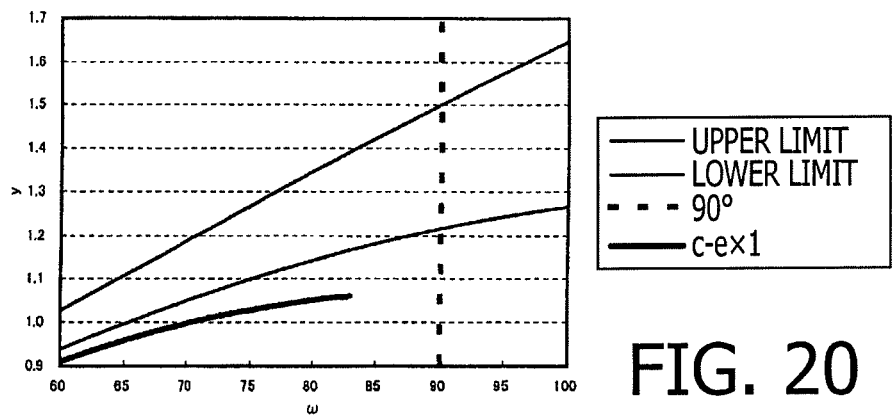
FIG. 20 is a diagram illustrating a relationship between the image height and the view angle defining the condition (5) in a comparative example 6 regarding the invention.

FIGS. 14 to 19 illustrate the relationships between the image height and the view angle defining the condition (5) respectively for the examples 1 to 6. FIG. 20 illustrates the relationship between the image height and the view angle defining the condition (5) for the comparative example 1. In each of FIGS. 14 to 20, the vertical axis represents the image height (unit: mm), and the horizontal axis represents the view angle (unit: degree). In these drawings, a solid line (a thick line) represents the value of the condition (5) of each of the examples, and two upper and lower solid lines (thin lines) represent the upper and lower limits of the condition (5).

As shown in FIGS. 14 to 18, the objective lens 100 for an endoscope according to each of the examples 1 to 5 satisfies the condition (5) within the view angle satisfying the condition (5). Therefore, it is possible to image a subject within the tube wall field area in a high resolution and to effectively avoid decrease of the resolution in the vicinity of the center of the field. Since, as shown in FIG. 19, the objective lens 100 for an endoscope according to the example 6 slightly exceeds the upper limit of the condition (5) in the view angle satisfying the specification, the resolution in the vicinity of the center of the field decreases. Since, as shown in FIG. 20, the objective lens 100 for an endoscope according to the comparative example 1 is lower than the lower limit of the condition (5), it is impossible to image a subject in the tube wall field area in a high resolution and therefore it is not suitable for observation for a tube cavity.

The foregoing is the explanations for the embodiment of the present invention. The invention is not limited to the above described configurations, but can be varied within the scope of the technical concept of the invention.

What is claimed is:

1. An objective lens for an endoscope, comprising:
   a first lens group having a negative power;
   an aperture stop; and
   a second lens group having a positive power,
   wherein the first lens group, the aperture stop and the second lens group are arranged in this order from an object side,
   wherein:
   the first lens group comprises at least a negative front group lens having a concave surface facing an image side, and a positive front group lens having a convex surface facing the image side, the negative front group lens and the positive front group lens being arranged in this order from the object side;
   the second lens group comprises at least a positive rear group lens having a convex surface facing the image side and a cemented lens formed by cementing together a negative lens and a positive lens, the positive rear group lens and the cemented lens being arranged in this order from the object side; and
   when a focal length of the first lens group is defined as $f_F$ (unit: mm), a total focal length of the first lens group and the second lens group is defined as f (unit: mm), a radius of curvature of an object side surface of the negative front group lens is defined as $R_1$ (unit: mm), and a radius of curvature of an image side surface of the negative front group lens is defined as $R_2$ (unit: mm), the objective lens for an endoscope satisfies following conditions (1) and (2):

$$-3.5 \leq f_F/f \leq -1.5 \tag{1}$$

$$1.3 \leq SF \leq 1.6 \tag{2}$$

where $SF = (R_1 + R_2)/(R_1 - R_2)$.

2. The objective lens for an endoscope according to claim 1,
   wherein when a focal length of the negative front group lens is defined as $f_1$, the objective lens for an endoscope satisfies a following condition (3):

$$-1.8 \leq f_1/f \leq -1.1 \tag{3}.$$

3. The objective lens for an endoscope according to claim 1,
   wherein when a focal length of the positive rear group lens is defined as $f_3$, the objective lens for an endoscope satisfies a following condition (4):

$$2.0 \leq f_3/f \leq 4.0 \tag{4}.$$

4. The objective lens for an endoscope according to claim 1,
   wherein when a maximum image height in an imaging plane is defined as y, an intermediate image height lower than the maximum image height y is defined as $y_i$, a half view angle corresponding to the maximum image height y is defined as $\omega_m$, and a half view angle corresponding to the intermediate image height $y_i$ is defined as $\omega_i$, the objective lens for an endoscope satisfies a following condition (5):

$$1.3 \times \sin(\omega_i/1.3) \leq y_i/f \leq 3.0 \times \sin(\omega_i/3.0) \tag{5}$$

where $60° \leq \omega_i \leq \omega_m$.

5. The objective lens for an endoscope according to claim 1, wherein an object side surface of the positive front group lens is a planar surface.

6. The objective lens for an endoscope according to claim 1,
   wherein when an incident angle of a light ray entering to a point at the maximum image height y with respect to the object side surface of the negative front group lens is defined as θ, the objective lens for an endoscope satisfies a following condition (6):

$$\theta \leq 75 \tag{6}.$$

7. The objective lens for an endoscope according to claim 1,
   wherein when a maximum image height in an imaging plane is defined as y, the objective lens for an endoscope satisfies a following condition (7):

$$2.0 \leq R_1/y \leq 5.5 \tag{7}.$$

8. The objective lens for an endoscope according to claim 1,
   wherein when a maximum image height in an imaging plane is defined as y, and an effective beam radius of the negative front group lens at the maximum image height y is defined as D, the objective lens for an endoscope satisfies a following condition (8):

$$2.0 \leq D/y \leq 3.0 \tag{8}.$$

9. The objective lens for an endoscope according to claim 1,
   wherein the second lens group further comprises a positive lens between the positive rear group lens and the cemented lens.

10. An endoscope, comprising an objective lens for an endoscope according to claim 1 installed in a tip portion of the endoscope.

* * * * *